United States Patent [19]

Hegner et al.

[11] Patent Number: 5,050,035
[45] Date of Patent: Sep. 17, 1991

[54] CAPACITIVE PRESSURE SENSOR AND METHOD OF MANUFACTURING SAME

[75] Inventors: Frank Hegner; Manfred Frank, both of Maulburg, Fed. Rep. of Germany

[73] Assignee: Endress u. Hauser GmbH u. Co., Fed. Rep. of Germany

[21] Appl. No.: 496,539

[22] Filed: Mar. 20, 1990

[30] Foreign Application Priority Data

Mar. 21, 1989 [DE] Fed. Rep. of Germany ....... 3909185

[51] Int. Cl.⁵ .................... H01G 7/00; H01G 5/16; H01G 4/12
[52] U.S. Cl. .................... 361/283; 29/25.42; 73/718
[58] Field of Search .......... 29/25.42, 25.41; 361/283, 321; 73/718, 724

[56] References Cited

U.S. PATENT DOCUMENTS

| | | | |
|---|---|---|---|
| 3,376,376 | 4/1968 | Smith | 174/52 |
| 3,405,559 | 10/1968 | Moffatt | 73/398 |
| 3,609,482 | 9/1971 | Edelman et al. | 361/321 |
| 3,634,727 | 1/1972 | Polye | 361/283 |
| 3,748,571 | 7/1973 | Kurtz | 361/283 |
| 3,858,097 | 12/1974 | Polye | 361/283 |
| 3,993,939 | 11/1976 | Slavin et al. | 361/283 |
| 4,064,550 | 12/1977 | Dias et al. | 361/283 |
| 4,168,518 | 9/1979 | Lee | 361/283 |
| 4,177,496 | 12/1979 | Bell et al. | 361/283 |
| 4,184,189 | 1/1980 | Davis et al. | 361/283 |
| 4,345,299 | 8/1982 | Ho | 361/283 |
| 4,388,668 | 6/1983 | Bell et al. | 361/283 |
| 4,424,713 | 1/1984 | Kroninger, Jr. et al. | 73/718 |
| 4,426,673 | 1/1984 | Bell et al. | 361/283 |
| 4,528,613 | 7/1985 | Stetson et al. | 361/321 |
| 4,542,436 | 9/1985 | Carusillo | 361/283 |
| 4,581,676 | 4/1986 | Baxter et al. | 361/283 |

FOREIGN PATENT DOCUMENTS

| | | |
|---|---|---|
| 0024945 | 3/1981 | European Pat. Off. . |
| 0097339 | 1/1984 | European Pat. Off. . |
| 2021479 | 11/1971 | Fed. Rep. of Germany . |
| 2556947 | 7/1976 | Fed. Rep. of Germany . |
| 2631883 | 3/1977 | Fed. Rep. of Germany . |
| 2709945 | 9/1977 | Fed. Rep. of Germany . |
| 2715339 | 10/1978 | Fed. Rep. of Germany . |
| 3137219 | 4/1983 | Fed. Rep. of Germany . |
| 1540765 | 2/1979 | United Kingdom . |

OTHER PUBLICATIONS

Philips Tech. Rev. 43, No. 4, pp. 86-93, Feb. 1987, V. Graeger, R. Kobs and M. Liehr, West Germany, "A Ceramic Differential-Pressure Transducer".

*Primary Examiner*—Donald A. Griffin
*Attorney, Agent, or Firm*—Barnes & Thornburg

[57] ABSTRACT

This rugged, temperature-shock-insensitive, and low-cost pressure sensor (1) has a diaphragm (2) and a substrate (3) which are alumina-ceramic parts, preferably with a purity of 96%, are joined together in a defined spaced relationship and parallel to each other by means of an intermediate layer, forming a, preferably closed, chamber, and have flat inner surfaces which are provided with at least one conductive layer for forming at least one capacitor and are electrically connected to the respective rear side of the diaphragm or substrate via through-hole coatings. For the conductive layers (6, 7, 8), the through-hole coatings (12, 13, 14), and the intermediate layer (5), use is made of a conductive paste or a resistive paste with a sheet resistivity not higher than 1 ohm/square, which are applied using silk-screening techniques.

20 Claims, 1 Drawing Sheet

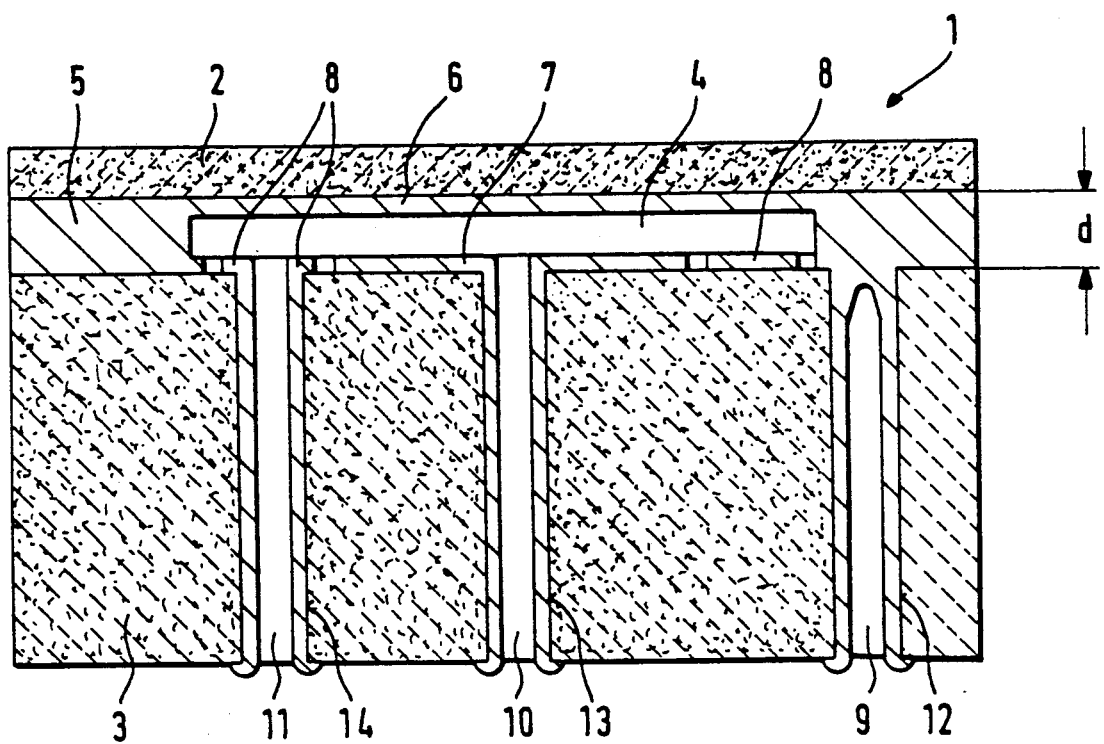

CAPACITIVE PRESSURE SENSOR AND METHOD OF MANUFACTURING SAME

The present invention relates to a capacitive pressure sensor with the features of claim 1 and to a method of manufacturing same with the features of claim 3.

According to the wording of the former claim, the capacitive pressure sensor comprises a diaphragm and a substrate which are alumina-ceramic parts, preferably with a purity of 96%, are joined together in a defined spaced relationship and parallel to each other by means of an intermediate layer, forming a, preferably closed, chamber, and have inner surfaces which are provided with at least one conductive layer for forming at least one capacitor and are electrically connected to the respective rear side of the diaphragm or substrate via through-hole coatings. For the conductive layers, the through-hole coatings, and the intermediate layer, use is made of a conductive paste or a resistive paste with a sheet resistivity not higher than 1 ohm/square, which are applied using silk-screening techniques.

According to the wording of claim 3, the invention also relates to a method of manufacturing the above pressure sensor. The method comprises the steps of printing the paste on the desired areas in a thickness suitable for the conductive layers and forcing it into the holes provided for the through-hole coatings or drawing it into said holes by applying vacuum, drying the applied paste, producing the necessary thickness of the intermediate layer by printing additional paste in the area of the intermediate layer and, after drying the paste again, putting the coated ceramic parts one on top of the other and firing them.

The object of the invention is to provide a pressure sensor of the above kind which is extremely rugged and, in particular, insensitive to thermal shocks, and whose alumina-ceramic parts, which preferably have a degree of purity of 96%, are fitted together in a simple manner, and a method of manufacturing such a pressure sensor.

Pressure sensors in accordance with the invention are characterized by high mechanical strength, loadability, and thermal-shock resistance and, if necessary, by very good and reliable vacuum tightness and can be manufactured by a simple method. The method involves only a single firing step. The diaphragm is uniformly joined to the substrate without mechanical inperfections at the joint. Since the latter is conductive, good contact to the diaphragm is ensured.

It is quite surprising that the pastes employed in the silk-screening process used in thick-film circuit fabrication to produce conductors and resistors is also suited for uniting alumina-ceramic parts of pressure sensors. In the pressure sensors manufactured in accordance with the invention, no adverse affects on sensor behavior, such as creep, hysteresis, or sensitivity changes, could be observed over a wide temperature range.

Further features and advantages of the invention will become apparent from the following description of the accompanying drawing, which shows an embodiment of the invention in a schematic cross section.

The pressure sensor 1 shown in the drawing comprises the diaphragm 2 in the form of a circular disk with plane-parallel surfaces which is joined around its periphery to a circular substrate 3 in a defined spaced relationship d, so that the chamber 4 is formed between the flat top of the substrate 3 and the opposite surface of the diaphragm 2. The diaphragm 2 and the substrate 3 are alumina-ceramic parts. The diaphragm 2 is elastic, so that it can deform when pressure is applied to it. The substrate 3 may be solid and rigid, but if desired, it may also be designed as a flat elastic disk like the diaphragm 2. By means of the intermediate layer 5, diaphragm and substrate 3 are permanently joined together.

Those surfaces of the diaphragm 2 and substrate 3 which face each other within the chamber 4 are provided with circular and annular conductive layers 6 and 7, 8, respectively. The substrate 3 has holes 9, 10, 11, through which electric contact is made to the conductive layers 6, 7, 8. The two conductive layers 6, 7 form the electrodes of a first capacitor, and the two conductive layers 6, 8 those of a second capacitor, whose capacitances depend on the distance between the conductive layers. When the diaphragm 2 deforms under pressure, the distances between the two conductive layers 6, 7 and between the two conductive layers 6, 8 change, thereby changing the capacitances of the pressure sensor. These capacitances can be measured by means of an electronic circuit connected to the metallizations in the holes 9, 10, 11, and thus serve as a measure of the pressure on the diaphragm 2.

The peculiarity of the pressure sensor shown consists in the way the intermediate layer 5 and the conductive layers 6, 7, 8 are designed, and in the way the latter are contacted, namely via the contact coatings 12, 13, 14, which line the holes 9, 10, 11 and extend over the lower surface of the substrate 3 at the outer ends of the holes by a short distance. The material for all these conductive layers is a conductive paste or a resistive paste with a sheet resistivity not higher than 1 ohm/square, preferably a paste with the same composition for all layers, with the conductive paste being advantageously free of glass.

Thus, the conductive layer 6 of the upper, common capacitor plate is electrically connected to the rear side of the substrate 3 via the intermediate layer 5 and the through-hole coating 12. The conductive layer 7 of the second plate of the above-mentioned first capacitor is contacted via the through-hole coating 13, and the conductive layer 8 of the second plate of the second capacitor via the through-hole coating 14. Electrical connections to the above-mentioned measuring circuit can be made, for example, by soldering leads to the above-mentioned projecting ends of the layers 12, 13, 14 or by directly placing on and bonding leads of electronic components.

Thanks to the structure described, the pressure sensor 1 is extremely easy and inexpensive to manufacture. Use is made of the stencil screens used in the silk-screening process employed for thick-film circuit fabrication. First, the paste is printed on all desired areas, in a thickness sufficient for metallizing them and making contact thereto, by being squeezed through the openings in a corresponding first mask. At the same time, the paste is forced into the holes or, if this should be impossible because of the thickness of the ceramic part and the selected hole diameter, drawn into the holes by applying vacuum. After removal of the stencil screen, the printed paste is dried.

Then, the remaining part of the paste necessary for the total thickness d of the intermediate layer 5 is printed by means of a second mask of corresponding thickness. After another drying process, diaphragm and substrate are bonded together in the usual manner by firing.

The adhesion of the resistive paste to and between the alumina-ceramic parts is typically about 70 N/mm$^2$ as compared to about 30 N/mm$^2$ with pure glass frit.

What is claimed is:

1. A method of manufacturing a capacitive pressure sensor comprising a diaphragm and a substrate which are joined together by an intermediate layer in a defined spaced relationship, substantially parallel to each other, and forming a chamber therebetween, said diaphragm having a flat inner surface and at least one first conductive layer formed on said inner surface and said substrate having a flat top surface facing the inner surface of the diaphragm and at least one second conductive layer formed on said top surface, the at least one first conductive layer and the at least one second conductive layer cooperating to provide at least one capacitor therebetween, at least one of the first or second conductive layers being electrically coupled to at least one through-hole coating formed on at least one aperture extending through the diaphragm or substrate, the method comprising the steps of:

applying a conductive or a resistive paste having a uniform composition to the substrate and diaphragm by printing using silk-screen techniques to form said at least one first and second conductive layers, said at least one through-hole coating, and said intermediate layer, said paste being applied by the steps of:

printing the paste in desired areas of the substrate and diaphragm in a thickness suitable to form said at least one first and second conductive layers and forcing the paste into at least one hole provided int he diaphragm or substrate to form said at least one through-hole coating, waiting for the applied paste to dry, printing an additional paste layer having a predetermined thickness in the area of said intermediate layer to form said intermediate layer, waiting for the additional paste layer to dry, placing said coated diaphragm on top of said coated substrate, and firing the diaphragm and substrate to bond the diaphragm to the substrate to form the capacitive pressure sensor.

2. The method of claim 1, wherein the diaphragm and substrate are formed from an alumina-ceramic material.

3. The method of claim 2, wherein the alumina-ceramic material has a purity of 96%.

4. The method of claim 1, wherein the step of forcing the paste into the at least one hole to form said at least one through-hole coating includes drawing the paste into said at least one hole by applying a vacuum to the at least one hole.

5. The method of claim 1, wherein the conductive or resistive paste has a sheet resistivity less than or equal to 1 ohm/square.

6. The method of claim 1, wherein the conductive paste does not include any glass.

7. A capacitive pressure sensor comprising a diaphragm having an outer surface and a substantially planar inner surface, a substrate including a top surface facing the inner surface of the diaphragm, the substrate being formed to include at least one aperture extending therethrough in communication with the top surface, a first conductive layer formed on the inner surface of the diaphragm, a second conductive layer formed on the top surface of the substrate, a third conductive layer configured to line said aperture extending through the substrate, the third conductive layer being electrically coupled to the second conductive layer, and an intermediate layer for coupling the diaphragm to the substrate to position the inner surface of the diaphragm a predetermined distance away from the top surface of the substrate to provide a capacitor therebetween formed by the first and second conductive layers, the intermediate layer and the first, second, and third conductive layers being formed from a material having a uniform composition.

8. The sensor of claim 7 further comprising a fourth conductive layer formed on the top surface of the substrate surrounding the second conductive layer and spaced apart from the second conductive layer to form a second capacitor with the first conductive layer, the substrate being formed to include first and second apertures extending therethrough, the third conductive layer being configured to line the first aperture, the third conductive layer being electrically coupled to the second conductive layer, and a fifth conductive layer being configured to line the second aperture extending through the substrate, the fifth conductive layer being electrically coupled to the fourth conductive layer, the fourth and fifth conductive layers being formed from the same uniform configuration material as the intermediate layer and the first, second, and third conductive layers.

9. The sensor of claim 8, wherein the substrate is formed to include a third aperture extending therethrough, and further comprising a sixth conductive layer configured to line said third aperture extending through the substrate, the sixth conductive layer being electrically coupled to the intermediate layer and the first conductive layer, the sixth conductive layer being formed from the same uniform composition material as the intermediate layer and the first, second, third, fourth, and fifth conductive layers.

10. The sensor of claim 7, wherein said material having a uniform composition includes a conductive or resistive paste.

11. The sensor of claim 10, wherein the conductive or resistive paste has a sheet resistivity less than or equal to 1 ohm/square.

12. The sensor of claim 10, wherein the conductive paste does not include any glass.

13. The sensor of claim 10, wherein the conductive paste is applied to the diaphragm and substrate using silk-screen techniques to form said first, second, and third conductive layers and said intermediate layer.

14. A capacitive pressure sensor comprising a diaphragm having an outer surface and a substantially planar inner surface, a substrate including a top surface facing the inner surface of the diaphragm, a first conductive layer formed on the inner surface of the diaphragm, a second conductive layer formed on the top surface of the substrate, an intermediate layer for coupling the diaphragm to the substrate to position the inner surface of the diaphragm a predetermined distance away from the top surface of the substrate to provide a capacitor therebetween formed by the first and second conductive layers, the intermediate layer and the first, second, and third conductive layers being formed from a material having a uniform composition.

15. The sensor of claim 14, wherein the substrate is formed to include an aperture extending therethrough in communication with the top surface, and further comprising a third conductive layer configured to line said aperture extending through the substrate, the third conductive layer being electrically coupled to the second conductive layer through the aperture, the intermediate layer and the first, second, and third conductive layers being formed from the same material having a uniform composition.

16. The sensor of claim 15, further comprising a fourth conductive layer formed on the top surface of the substrate surrounding the second conductive layer and spaced apart from the second conductive layer to form a second capacitor with the first conductive layer, the substrate being formed to include first and second apertures extending therethrough, the third conductive layer being configured to line the first aperture, and a fifth conductive layer being configured to line the second aperture extending through the substrate, the fifth conductive layer being electrically coupled to the fourth conductive layer through the second aperture, the fourth and fifth conductive layers being formed from the same uniform composition material as the intermediate layer and the first, second, and third conductive layers.

17. The sensor of claim 16, wherein the substrate is formed to include a third aperture extending therethrough, and further comprising a sixth conductive layer configured to line said third aperture extending through the substrate, the sixth conductive layer being electrically coupled to the intermediate layer and the first conductive layer through the third aperture, the sixth conductive layer being formed from the same uniform composition material as the intermediate layer and the first, second, third, fourth, and fifth conductive layers.

18. The sensor of claim 14 wherein said material having a uniform composition includes a conductive or resistive paste.

19. The sensor of claim 18, wherein the conductive or resistive paste has a sheet resistivity less than or equal to 1 ohm/square.

20. The sensor of claim 18, wherein the conductive paste is applied to the diaphragm and substrate using silk-screen techniques to form said first and second conductive layers and said intermediate layer.

* * * * *